United States Patent [19]
Fellrath et al.

[11] 3,863,148
[45] Jan. 28, 1975

[54] METHOD AND APPARATUS FOR MEASURING THE RESISTANCE, RESISTIVITY OR THE CROSS-SECTIONAL AREA OF AN ELECTRICAL CONDUCTOR SUCH AS A WIRE, CABLE OR BAR

[75] Inventors: Paul-Henri Fellrath, Cortaillod; Gérard Lavanchy, Prilly, both of Switzerland

[73] Assignee: Societe d'Exploitation des Cables Electriques Systeme Berthoud Borel & Cie, Cortaillod, Switzerland

[22] Filed: May 4, 1973

[21] Appl. No.: 357,187

[52] U.S. Cl. .................................. 324/64
[51] Int. Cl. ............................. G01r 27/14
[58] Field of Search .................. 324/64, 62

[56] References Cited
UNITED STATES PATENTS
3,417,329 12/1968 Landis et al. ..................... 324/64 X
3,665,302 5/1972 Lees et al. ............................ 324/64

FOREIGN PATENTS OR APPLICATIONS
503,373 7/1930 Germany ............................ 324/64

Primary Examiner—Stanley T. Krawczewicz
Attorney, Agent, or Firm—Robert E. Burns; Emanuel J. Lobato; Bruce L. Adams

[57] ABSTRACT

To measure the resistance, resistivity or the cross-sectional area of a conducting cable or the like, a return conductor is connected to a length of the cable to form a loop, a low frequency alternating current of given value is induced in the loop, and the potential difference between two points on said length of cable set at a fixed distance from one another is measured.

21 Claims, 2 Drawing Figures

METHOD AND APPARATUS FOR MEASURING THE RESISTANCE, RESISTIVITY OR THE CROSS-SECTIONAL AREA OF AN ELECTRICAL CONDUCTOR SUCH AS A WIRE, CABLE OR BAR

The invention relates to measurement of the resistance, resistivity or the cross-sectional area of an electrical conductor, whether a wire, cable, bar or other elongate member of generally uniform section, for which, following the traditional method, it is necessary to take a sample of the conductor to be measured and to carry out the necessary measurements on it.

An object of the invention is to provide a method with which it is possible not only to carry out all these measurements without taking a sample, but also to carry them out directly at the outputs of production machines: cable twisters, wire-drawers, extruders, etc.

According to the invention, there is provided a method of measuring any one of the resistance, the resistivity and the cross-sectional area of an elongate electrical conductor of generally uniform cross-section, comprising connecting a return conductor to a length of said elongate conductor to form a loop, inducing an alternating current of given value in said loop, and measuring the potential difference between two points on the said length of the conductor set at a fixed distance from one another.

The invention also includes an apparatus for implementing this method, said apparatus comprising a return conductor, means for connecting said return conductor to a length of said elongate conductor to form a loop, a source of alternating current, a winding driven by said source in such a manner as to induce a current in said loop, and a rule bearing two mutually isolated contact points set at a predetermined distance from one another, these two points being electrically connected to a voltage measuring device.

The said method is primarily intended for industrial use but may equally well be used in the laboratory, due in particular to the fact that the loop in which the measuring current circulates is closed by a return conductor thus permitting the extremities of the conductor to be measured to be isolated, grounded or short-circuited. Due to its extreme simplicity, the apparatus for carrying out the method can be operated by non-qualified personnel. By employing an electronic system, it is possible to directly express and/or display the results of the measurements. The apparatus for carrying out this method can be fixed or mobile, mounted on a trolley or carried.

The accompanying drawings show by way of example, two embodiments of a measuring apparatus for carrying out this method. In the drawings.

Figure 1:
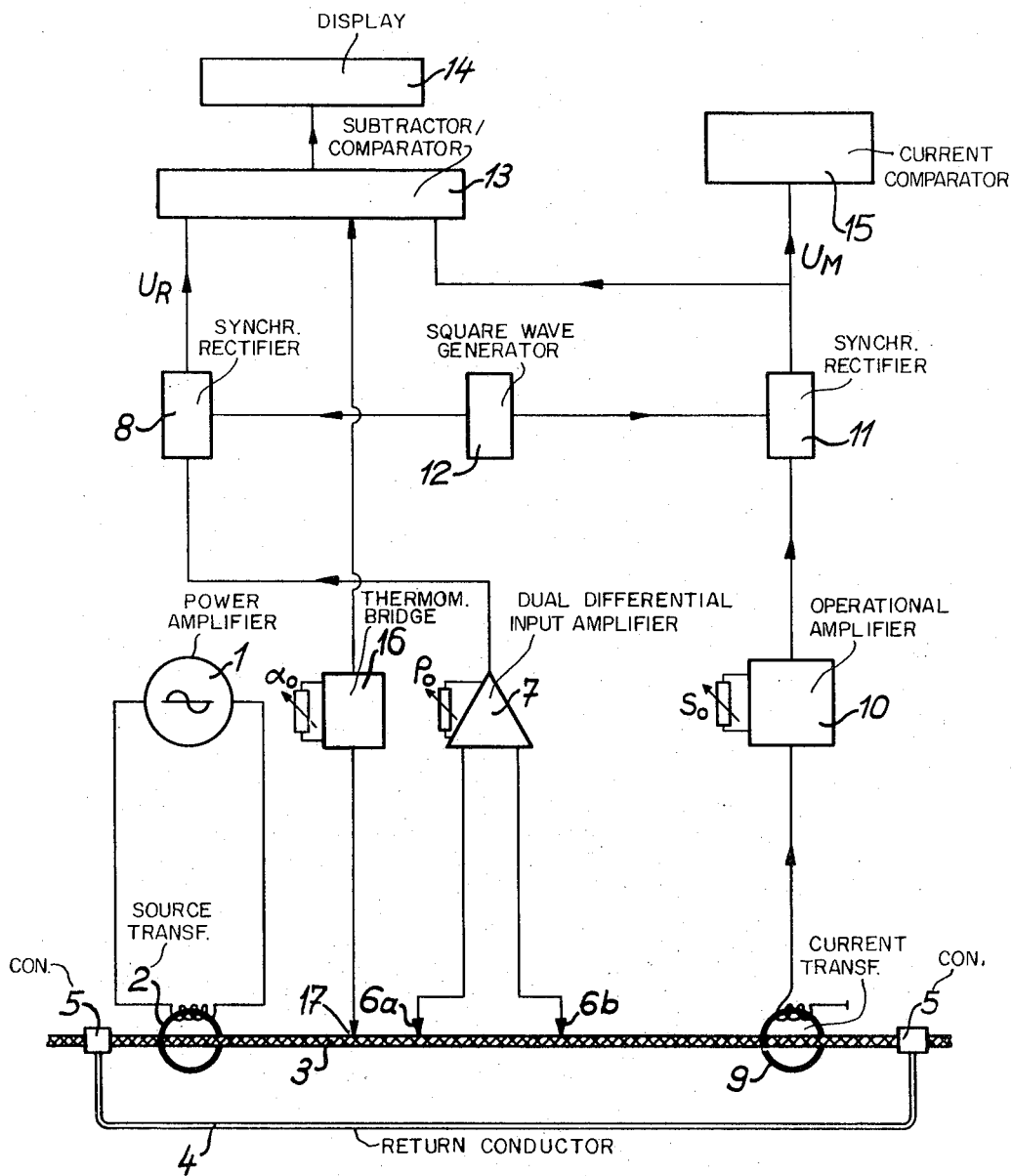
FIG. 1 is a circuit diagram of a first embodiment of measuring apparatus.

The measuring apparatus shown in FIG. 1 comprises a very low frequency sinusoidal voltage generator 1 which feeds a winding of a toroidal core 2 placed around a strand 3 of conducting wires to be measured. In this application, the frequency must be low to avoid skin effect and to have the mains frequency as an even harmonic so as to be able to eliminate the influence of the mains supply by synchronous rectification. This toroidal core 2 includes a removable pole piece whereby the core 2 can be opened to enable it to be placed about the strand 3, and then closed by replacing said pole piece. A loop, which allows a current to be set up, is provided by fixing a conductor 4 at two points on the strand 3 by means of two connectors 5. Two contact points 6a and 6b, borne by a rule, with a fixed distance between them, are applied to the strand 3 which is held straight. A current can be induced in the strand 3 for a sufficiently short period to avoid any heating of the strand, but can be automatically repeated to ensure that thermal stability has been reached by the repetition of identical results.

The induced current flowing in strand 3 produces a measurable potential drop between the contact points 6a and 6b. to measure this potential drop, the contact points 6a and 6b are connected to the direct and inverse inputs respectively of an operational amplifier 7 which generates at its output an alternating voltage proportional to the difference of potential between the contact points 6a and 6b. The gain of amplifier 7 is adjustable by a switch as a function of the resistivity $\rho_o$ of the strand 3. This alternating voltage is rectified by a synchronous rectifier 8.

The rectified measuring voltage $U_R$ is proportional to the current flowing in the strand 3 and to the electrical resistance of the strand 3, over a length equal to the distance between the contacts 6a and 6b, and is inversely proportional to the actual cross-sectional area 5 of the strand 3.

The alternating current flowing in the strand 3 is measured by a toroidal current transformer 9, the magnetic circuit of which comprises a removable piece, allowing the strand 3 to be inserted. A shunt of an electronic device 10 enables the delivery of a voltage proportional to the current induced in the winding of transformer 9 to the input of an operational amplifier, the gain of which is adjustable inversely proportional to a reference cross-sectional area $S_o$, set by means of switches provided for this purpose.

The alternating voltage from the device 10 is rectified by a synchronous rectifier 11 driven by the same signal as the synchronous rectifier 8. This signal is generated by a device 12 such as a square wave generator from the output voltage of the device 10 which is proportional to the current flowing in the strand 3. The rectifiers 8 and 11 are thus both synchronised with the current in the strand 3. This has the effect of suppressing inductive voltage drops and those due to the magnetizing current of the current transformer 9.

The rectified voltage $U_M$, from the rectifier 11 is proportional to the current flowing in the strand 3 and inversely proportional to the reference (or nominal) cross-sectional area $S_o$ of the strand 3.

An automatic thermometric bridge 16 measuring the temperature of the strand 3, provides a correction voltage proportional to the temperature coefficient $\alpha_o$ of the material of strand 3 and to the difference between the temperature of strand 3, and the reference temperature at which the resistivity $\rho_o$ has been defined. This correction voltage is subtracted from the measuring voltage $U_R$ and thus eliminates the influence of the strand temperature on the measurement.

These two measuring voltages $U_M$ and $U_R$ (and the voltage representing the correction provided by the thermometric bridge 16) are transmitted to a measuring stage (subtractor/comparator) 13 where the difference $(U_M - U_R)$ is compared to $U_R$ by a ratiometer. The result of the comparison, encoded in digital form, is applied to a numeric display device 14.

The displayed result s is equal to the deviation per thousand of the actual cross-sectional area of the strand 3 compared to the selected theoretical or nominal cross-section So.

$$s = (S - So/So) \; (°/°°)$$

The rectified voltage $U_M$ is also delivered to a comparator-regulator 15 which controls the power emitted by the low frequency generator 1. This servo-control enables operation of the device at a constant current density.

The second embodiment is similar to the first, and the same reference numerals have been used to designate the same elements; it however differs from the first embodiment by the following features:

- the second embodiment has no automatic thermometric bridge (16,17), but a device providing a temperature correction proportional to the temperature $\theta$ manually set by switches and acting on device 10.
- the operational amplifier 7 has a fixed gain. The correction proportional to the resistivity $\rho_o$ of the strand 3 acts on device 10.
- the device 12 driving the synchronous rectifiers 8 and 11, is supplied by an output signal from the generator 1.

Figure 2:
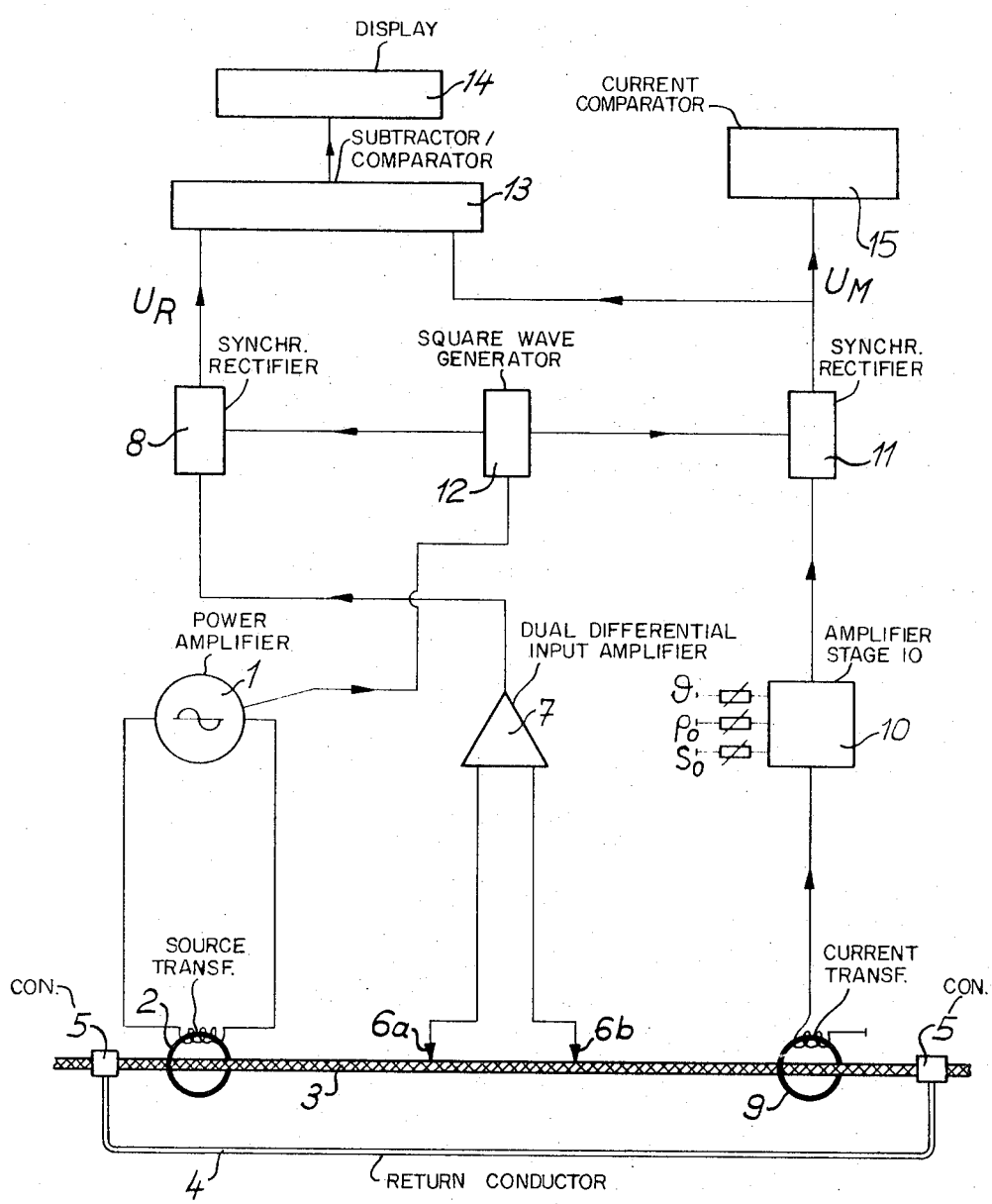
FIG. 2 is a circuit diagram of a second embodiment of measuring apparatus.

In the embodiment of FIG. 2, the amplifier 7 supplies an alternating voltage proportion to the potential difference between points 6a and 6b, without any temperature correction; this alternating voltage is rectified by a synchronous rectifier 8 driven by a signal supplied by a device 12 which is itself supplied by generator 1. The rectifier 8 thus supplies a rectified voltage free from the influence of parasitic voltages and inductive impedances, and proportional to the potential difference between points 6a and 6b.

The temperature of the strand 3 is also measured by means not shown, and an electronic correction device, acting on an operational amplifier 10, enables the rectified measured voltage, proportional to the current in strand 3, to be brought to the value it would have had if the strand 3 was at a reference temperature, for example 20°C, the measured temperature being set on decimal switches provided for this purpose. The rectified and corrected voltage $U_R$ supplied by rectifier 8 is proportional to the product of the current in strand 3 multiplied by the electrical resistance of the strand between points 6a and 6b, corrected to the reference temperature.

The induced alternating current in strand 3 induces an alternating voltage in the winding of a second toroidal core 9 removably disposed about strand 3. Said winding is connected to the input of operational amplifier 10 via an input resistance proportional to the nominal cross-sectional area $S_o$ of strand 3. The counteracting resistance is proportional to the theoretical or nominal resistivity $\rho_o$ and to the measured temperature $\theta$. The nominal values $S_o$ and $\rho_o$ are set by means of switches provided for this purpose. The alternating voltage at the output of amplifier 10 is thus proportional to the product of the current flowing in core 3 multiplied by a nominal resistance $R_o$ equivalent to that of a strand of length L, resistivity $\rho_o$ and cross-sectional area $S_o$.

This alternating voltage is rectified by a synchronous rectifier 11 driven by the same low frequency signal as rectifier 8, supplied by the device 12. This rectified voltage UM supplied by rectifier 11 is thus also proportional to the current in strand 3 multiplied by the nominal resistance $R_o$ of the strand.

As for the first embodiment, a measuring stage (subtractor-comparator) 13 compares the difference $(U_M - U_R)$ to $U_R$, and the result displayed by device 14 once more gives the deviations of the cross-sectional area S of the strand 3 from the nominal cross-sectional area $S_o$ according to the equation $$s = S - So/So \; (°/°°)$$

The synchronous rectifier consists of an operational amplifier and two FET-transistors. The operational amplifier inverts the input signal and both signals (direct and inverted) feed each a FET-transistor. The gates of the FET-transistors are controlled by two square signals, both in phase opposition, produced by the square wave generator: therefore only one FET-transistor is conducting at a time. The output chopped voltage coming from the two FET-transistors pass through a RC-filter and develops the output dc voltage.

The square wave generator consists of a generator producing two low frequency signals in phases opposition and two operational amplifiers working at saturation.

What we claim is:

1. A method of making on-line measurements of physical parameters such as resistance, resistivity and cross-sectional area on a selected section of an elongated electrical conductor comprising the steps of: forming a closed loop current path with a selected section of an elongated electrical conductor; externally inducing an alternating current having a predetermined value into said closed loop independent of a grounded, short-circuited or floating condition in the remainder of the electrical conductor; said current being externally induced by a toroidal core for a limited period during which the heat produced by it in said elongate conductor cannot influence the precision of the results of the measurement, measuring the potential drop between two points spaced apart a given distance on said selected section; and deriving a selected physical parameter from the measured information.

2. A method according to claim 1, in which the measuring cycle is repeated automatically until the results become stable.

3. A method according to claim 1, in which the current flowing in said elongated conductor is automatically regulated to a predetermined value.

4. A method according to claim 1, further comprising correcting the measured potential difference, by an electronic correcting device which is sensitive to the temperature of the conductor, to the value it would have at a reference temperature of said elongated conductor.

5. A method according to claim 1, in which said measured potential difference is compared to a second potential difference which said induced current would produce in a conductor in which the parameters which determine this potential difference are precisely fixed by a simulator.

6. A method according to claim 5, in which at least one of the potential differences is amplified.

7. A method according to claim 5, in which said potential differences are rectified by at least one synchronous rectifier, driven by a signal provided by an alternating current source which induces said induced current, to eliminate the influences of parisitic voltages and inductive impedances.

8. A method according to claim 5, in which said comparison of the two potential differences is made automatically by a ratiometer.

9. A method according to claim 8, in which the result of said comparison is expressed as a deviation with respect to a nominal value.

10. A method according to claim 9, in which said result is provided in numeric form.

11. An apparatus for making on-line measurements of physical parameters such as resistance, resistivity and cross-sectional area on a selected section of an elongated electrical conductor comprising: means defining a closed loop current path with a selected section of an elongated electrical conductor; means for externally inducing an alternating current having a predetermined value into said closed loop independent of a grounded, short-circuited or floating condition in the remainder of the electrical conductor; means for inducing comprising a first toroidal core through which the conductor passes during use and a winding mounted on said toroidal core, means external of said closed loop for measuring the potential drop between two points spaced apart a given distance on said selected section; and means for deriving a selected physical parameter from the measured information.

12. An apparatus according to claim 11, further comprising means for inducing a measuring voltage in the closed loop proportional to the current induced in the loop comprising a second winding and a second toroidal core surrounding said length of said elongated conductor.

13. An apparatus according to claim 12, in which each toroidal core is open.

14. An apparatus according to claim 13, in which each toroidal core is closed by at least one removable pole piece.

15. An apparatus according to claim 11, comprising means for automatically setting the current induced in said loop at a given value.

16. An apparatus according to claim 11, comprising electronic means for correcting the measured potential difference to the value it would have had if the temperature of the conductor was equal to a reference temperature.

17. An apparatus according to claim 16, in which said correcting means comprises a thermometric probe and an automatic thermometric bridge coacting therewith to provide a correction voltage which corrects the measured potential difference to the value it would have had if the temperature of the conductor was equal to a reference temperature.

18. An apparatus according to claim 11, comprising simulator means for providing a potential difference equal to that which the current induced in said elongate conductor would produce in a conductor in which the parameters which determine this potential difference are precisely fixed.

19. An apparatus according to claim 11, wherein said means for deriving comprises a ratiometer.

20. A method making on-line measurements of physical parameters such as resistance, resistivity and cross-sectional area on a selected length of an elongated electrical conductor comprising the steps of: forming a closed loop current path with a selected length of an elongated electrical conductor; externally inducing an alternating current having a predetermined value into said closed loop; measuring the potential drop between two points spaced apart a given distance on said selected length forming a secondary circuit comprising a resistance and inducing an alternating current in this secondary circuit from the alternating current in the loop; measuring the potential drop on the resistance of the secondary loop; correcting at least one of said measured potential drops to a value that it would have if at least one of said physical parameters of the measured electrical conductor and its temperature had a determined value different from its real value; comparing the two potential drops measured and indicating the result of the comparison.

21. An apparatus for making on-line measurements of physical parameters such as resistance, resistivity and cross-sectional area on a selected length of an elongated electrical conductor comprising: means defining a closed loop current path with a selected length of an elongated electrical conductor; means for externally inducing an alternating current having a predetermined value into said closed loop; means external of closed loop for measuring the potential drop between two points spaced apart a given distance on said selected length means defining a secondary circuit comprising a resistor; means for inducing an alternating current into said secondary circuit from said closed loop; means for introducing at least one correction to at least one of said potential drops; means for comparing the potential drop between said points and the potential drop on said resistor and means for indicating the result of the comparison.

* * * * *